United States Patent [19]
Kelly

[11] Patent Number: 6,092,104
[45] Date of Patent: Jul. 18, 2000

[54] METHOD FOR TRANSMITTING A FACSIMILE FROM A DESKTOP COMPUTER BY USING ELECTRONIC MAIL

[75] Inventor: Christopher T. Kelly, Marion, Iowa

[73] Assignee: Circle Computer Resources, Inc., Cedar Rapids, Iowa

[21] Appl. No.: 09/120,753

[22] Filed: Jul. 22, 1998

[51] Int. Cl.[7] .............................. G06F 13/00; H04N 1/00
[52] U.S. Cl. ......................... 709/206; 709/300; 358/400
[58] Field of Search .................................. 709/206, 217, 709/218, 300, 301, 302; 358/400, 402, 403, 401, 407, 440, 442

[56] References Cited

U.S. PATENT DOCUMENTS

| | | | |
|---|---|---|---|
| 5,461,488 | 10/1995 | Witek | 358/402 |
| 5,861,958 | 1/1999 | Jamrog | 358/403 |
| 5,872,926 | 2/1999 | Levac et al. | 709/206 |
| 5,881,233 | 3/1999 | Toyoda et al. | 709/233 |

Primary Examiner—Viet D. Vu
Attorney, Agent, or Firm—MWZB

[57] ABSTRACT

The invention according to a preferred embodiment provides a method for capturing print images from a computer application software program and transmitting the images to an e-mail address specified by a user. The method includes the steps of detecting custom printer driver selection from the user; capturing the document using the custom printer driver; converting one or more pages of the document into one or more images using an interface; attaching one or more images to an e-mail message; displaying the e-mail message and allowing the e-mail message to be edited by the user, wherein editing includes specifying one or more addresses where the document is to be sent; and sending the e-mail message, and, optionally dialing and connecting to the Internet if necessary, prior to sending the document to the designated e-mail addresses.

12 Claims, 5 Drawing Sheets

METHOD FOR TRANSMITTING A FACSIMILE FROM A DESKTOP COMPUTER BY USING ELECTRONIC MAIL

BACKGROUND OF THE INVENTION

1. Field of the Invention

The present invention relates in general to methods for electronic mail transmission, and in particular to a method for preparing and sending a facsimile from a computer application software program by utilizing a combination of a custom printer driver for generating facsimile graphic images and an electronic mail client for transmitting the images via electronic mail to selected recipients.

2. Description of the Prior Art

Various techniques are known for transmitting documents with images to a remote location. These techniques include the use of conventional facsimile machines, facsimile modems, and electronic mail transmissions.

When transmitting facsimiles using a conventional facsimile machine, one ordinarily performs the steps of: obtaining a hard copy document with images on it, physically taking the hard copy to a conventional fax machine, inserting the document in the input tray, dialing the telephone number of the receiving fax machine, and pressing a "start" button on the fax machine to begin transmission of the document.

When using a fax modem to transmit a document, one ordinarily performs the steps of: "printing" a document by selecting a "fax" printer from a list of printer drivers, entering or selecting the phone number of the receiving fax machine or fax modem, and sending the document.

When using e-mail, one ordinarily performs the steps of: inserting a document into an e-mail program, or attaching a document to an e-mail message, entering or selecting one or more addressees, and sending the document.

These techniques have been effective means for business and personal communications. However, there are problems and limitations associated with using traditional fax machines, fax modem, and e-mailing with graphic attachments.

With respect to conventional fax machines, one may be required to wait in line to use the fax machine, wait for an open telephone line if the telephone system is overloaded, clear paper jams which commonly occur when sending more than one page, and wait for retransmission attempts after "busy" signals are encountered. The limitations of conventional fax machines include their inability to transmit color images and their limited availability in homes. Color facsimile machines are available, but are generally expensive and can transmit in color only to other color facsimile machines. In addition to these potential problems associated with using conventional fax machines, one ordinarily must pay telecommunication charges for long distance connections. Also images are often garbled or otherwise corrupted in transmission by telephone line problems or paper jams by the receiving fax machine.

Problems associated with using fax modems include waiting for an open telephone line if the phone system is overloaded, and waiting for retransmission after "busy" signals. The limitations of fax modems include their inability to transmit color images, and their limited availability in homes. Like conventional fax machines, there are telecommunication charges for long distance connections when using a fax modem. Also images are often garbled or otherwise corrupted in transmission by telephone line problems or paper jams by the receiving fax machine.

With regard to the usage of e-mail with graphical attachments, one ordinarily must perform the manual-labor-intensive steps of generating a document in an application software program, saving the document, activating an e-mail application program, attaching the document to an e-mail message, and sending the e-mail message to recipients. At the receiving end, there is the possibility that the recipient does not having proper software for viewing the attachments or does not having compatible operating environment.

SUMMARY OF THE INVENTION

In view of the above, it is the broad object of the present invention to provide an improved method for transmitting facsimile.

The invention according to a preferred embodiment provides a method for capturing print images from a computer application software program and transmitting the images an e-mail address specified by a user. The method includes the steps of detecting custom printer driver selection from the user; capturing the document using the custom printer driver; converting one or more pages of the document into one or more images using an interface; attaching one or more images to an e-mail message; displaying the e-mail message and allowing the e-mail message to be edited by the user, wherein editing includes specifying one or more addresses where the document is to be sent; and sending the e-mail message, and, optionally dialing and connecting to the Internet if necessary, prior to sending the document to the designated e-mail addresses.

Upon further study of the specification and appended claims, further objects and advantages of this invention will become apparent to those skilled in the art.

BRIEF DESCRIPTION OF THE DRAWINGS

The foregoing and other objects, features, and advantages of the invention will be apparent from the following more particular description of preferred embodiments as illustrated in the accompanying drawings, in which reference character refer to the same parts throughout the various views. The drawing are not necessarily to scale, emphasis instead being placed upon illustrating principles of the invention.

In the accompanying drawings.

DETAILED DESCRIPTION OF THE PREFERRED EMBODIMENTS

Figure 1:
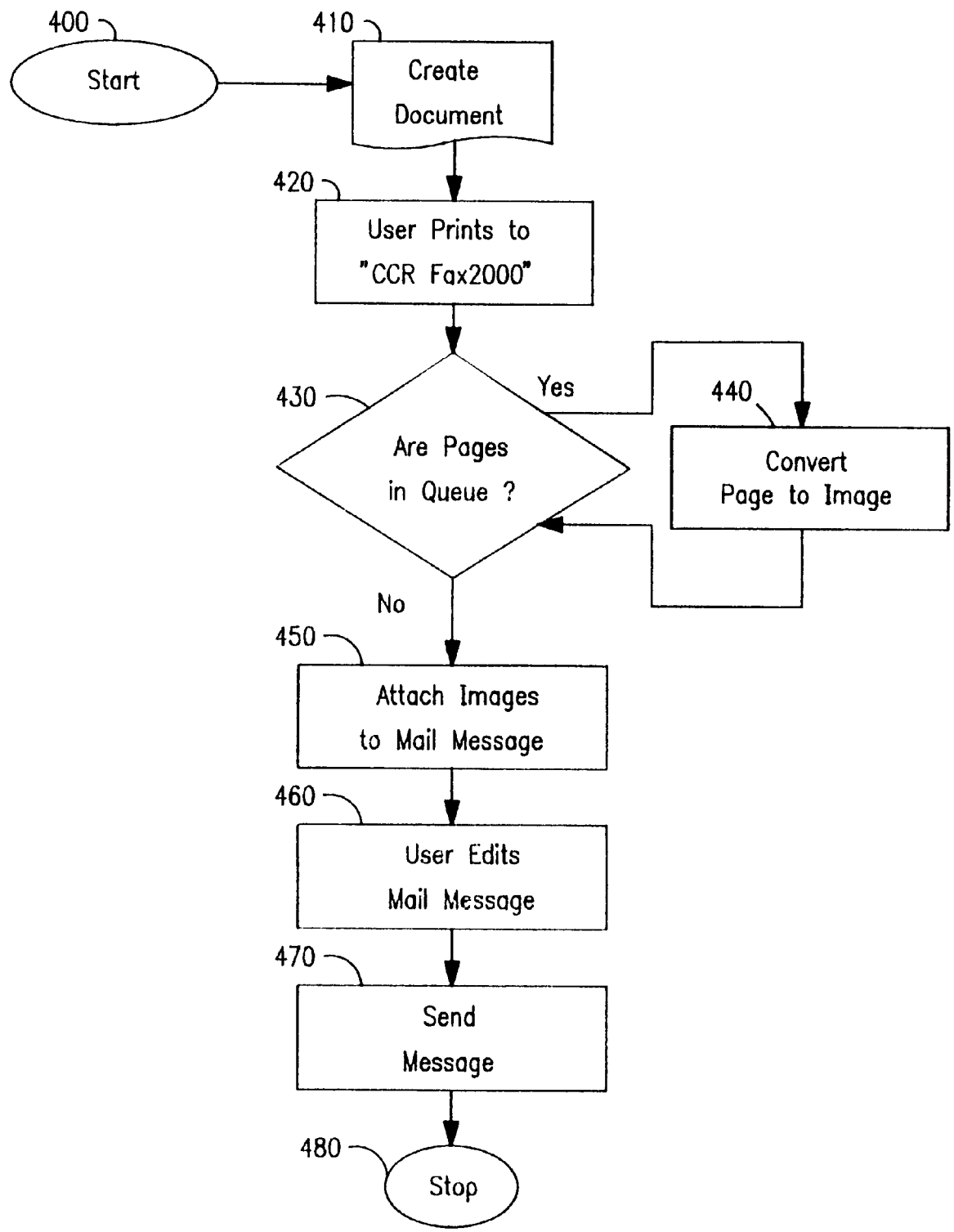
FIG. 1 is a flow diagram depicting high level process for sending documents via images in an e-mail message.

Reference is made to FIG. 1, which illustrates high-level flow operation diagram.

In block 410, a document is created by a user from an application software program, such as Microsoft Word, Microsoft Paint, Microsoft Excel, Microsoft Access, etc. When the user wishes to transmit an image of the document from within the application software program to one or more recipients, he selects the print option in the application software program and chooses "CCR Fax2000" driver, which is a custom printer driver of the present invention, as shown in block 420. The document, which may include one or more pages, is place in a queue, such as in block 430, for conversion to images, as shown in block 440. The document pages are converted to images by the software of the invention until there are no more pages to be converted. Then, in block 450, the images are attached to an e-mail message. The user may edit the mail message as shown in block 460. Once the user is satisfied with his/her message, the message is transmitted, as shown in block 470.

In another possible embodiment, the software of the invention may allow the user to edit the mail message prior to attaching the images to the e-mail message.

The invention according to a preferred embodiment comprises two parts, a driver and an interface. However, the driver and the interface may be combined into an integrated module.

The driver receives print data from Windows, then communicates the print data to the interface. The user customizes his/her message using the interface, and then the interface sends the message along with the print data to recipients.

Figure 2:
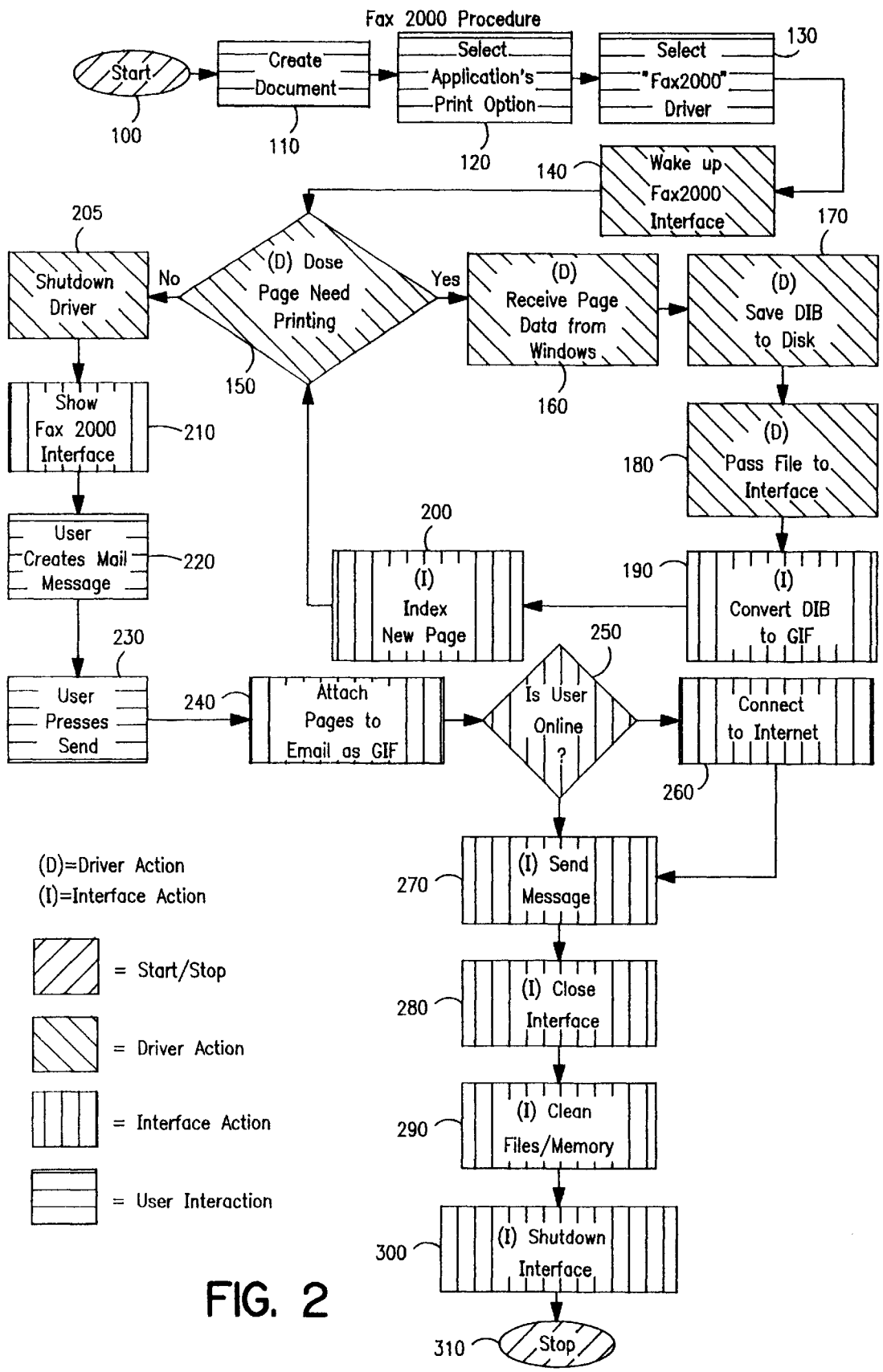
FIG. 2 is a more detailed flow diagram depicting the process in FIG. 1.

FIG. 2 shows a more detailed block diagram illustrating the operation of the invention according to a preferred embodiment. In block 110, a document is created by a user, using application software, such as Microsoft Word, Microsoft Access, Microsoft Excel, Microsoft Paint, etc.

Figure 3:
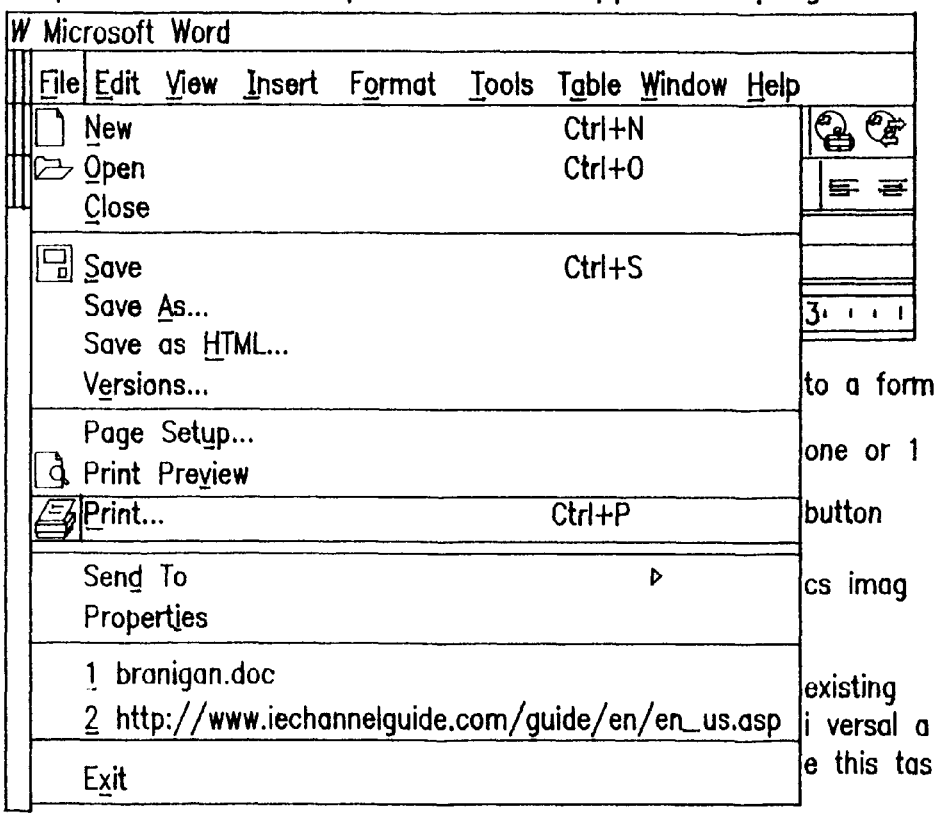
FIG. 3 is a sample screen illustrating a user selecting print option from an application program.

In block 120, a print option is selected in the application when the user wishes to transmit a copy of the document to one or more recipients. A sample screen for selecting the print option is shown is FIG. 3.

Figure 4:
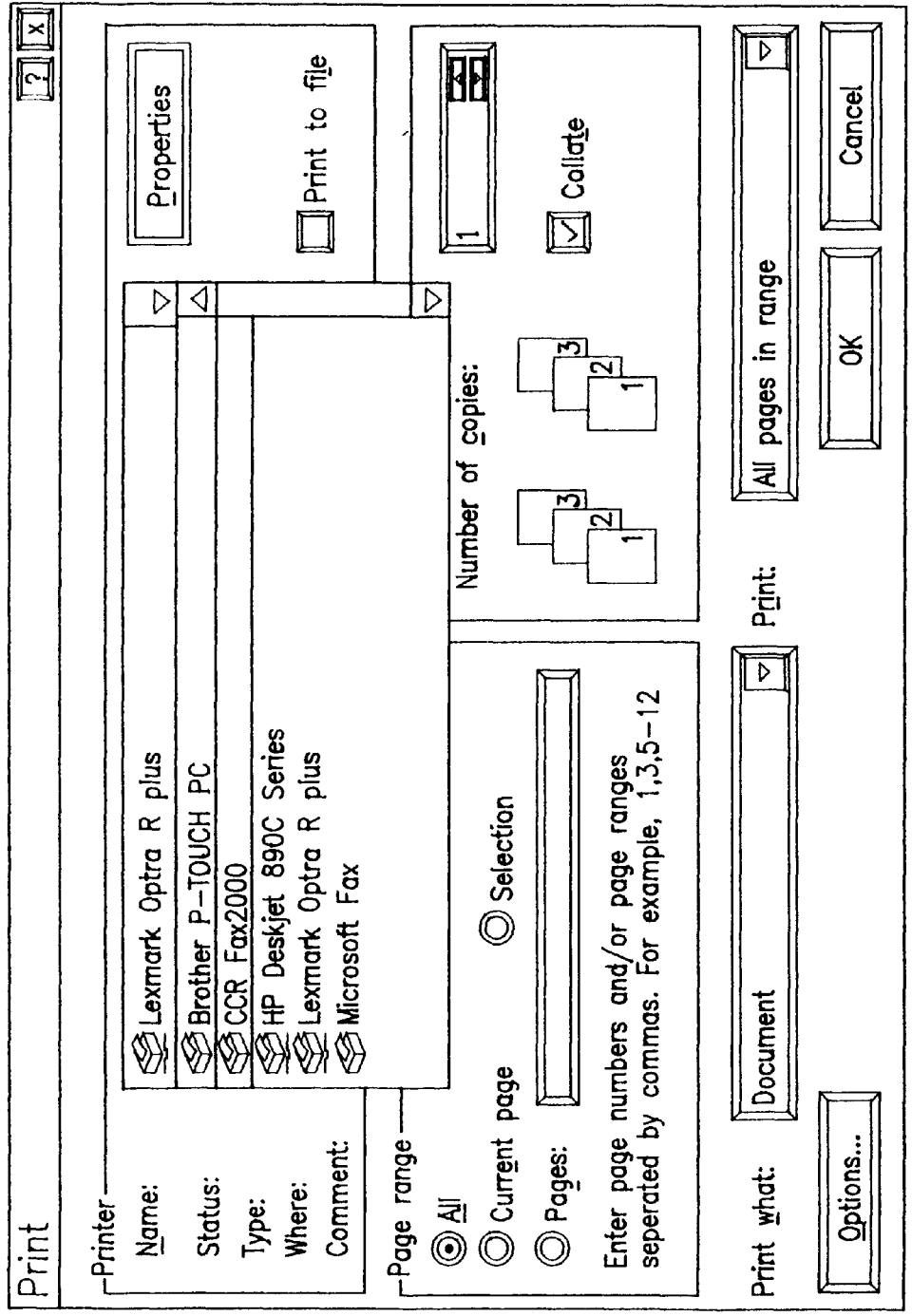
FIG. 4 is a sample screen illustrating user selecting a printer driver of the invention.

In block 130, the custom printer driver of the present invention is selected. A sample screen of the printer driver of the invention selection is shown in FIG. 4. Upon selecting the driver, the interface is evoked as shown in block 140. In block 150, a decision is made as to whether a page is printed. If "yes", then the printer driver obtains graphical information about the page and saves it as Device Independent Bitmap (DIB) file, as shown is block 160 and 170. The printer driver of the preferred embodiment uses standard Application Program Interface (API) and the operating system's universal printer driver dynamic link library, which is unidrv.dll in the case of window 95, to obtain graphical information about the page and save it as DIB file.

Figure 5:
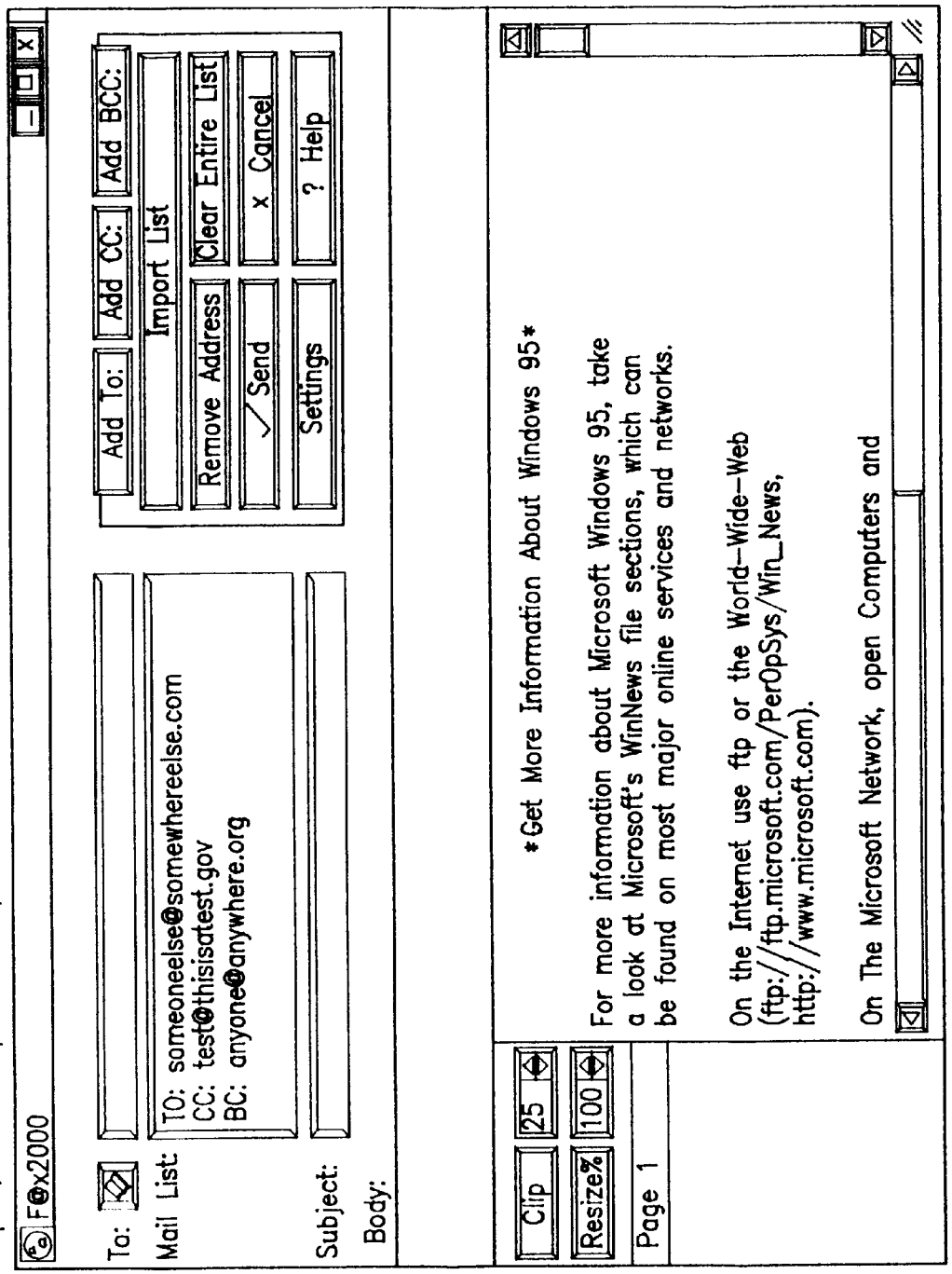
FIG. 5 is a sample screen illustrating a user entering recipients' addresses and sending a document.

After the page is completed, the driver notifies the interface of the invention that a page is completed and passes the filename of the DIB image on disk or other suitable memory medium, as shown in block 180. The interface then converts the DIB file to Graphics Interchange Format (GIF) in block 190. In block 200, the converted GIF file page is indexed. Block 200 leads to the decision block 150. From the decision block 150, if "No" is returned, then block 205 shuts down the printer driver. Block 210 then shows the interface which allows the user to create mail message and/or specify e-mail addresses of recipients in block 220. A sample of the interface screen is shown in FIG. 5.

After having created a mail message, the user clicks on a "Send" button. When the software of the invention receives a "Send" command, it automatically attaches the saved pages to the mail message as a GIF file. The software of the invention then optionally verifies if the user in online in block 250. If "No", then block 260 is executed to connect the PC to the Internet. Then the operation of software of the invention continues in block 270 where the Interface actually sends the e-mail message. In block 250, if the user is already on-line, then block 270 is executed. Once the mail is sent, block 280 initiates the closing of the Interface by cleaning up temporary files on disk/memory, as in block 290, and shuts down the Interface, as in block 300.

During the execution of software of the invention, all interactions between the printer driver and the interface are preferably completely transparent to the user.

The software of the invention can send documents in colors to Internet e-mail addresses from a machine connected to the Internet without incurring long-distance charges. Individuals with a modem for dial up connection in their computer can use the software of the invention without having to upgrade their modem to a more expensive but limited-capability fax modem.

Compared with traditional e-mail, the software of the present invention involves few steps and utilizes the highly established GIF format, which is supported by most Internet browsers and image viewers. Moreover, because the GIF image format is well established, there are viewers for virtually any operating environment.

The present invention can be made to be operable on a variety of computer platforms, such as Apple, Sun, or IBM-compatible personal computers (PCs), with a display, keyboard, a cursor pointer device, and a network connection means or a modem. The invention according to a preferred embodiment is designed for PCs operating under Windows 95/98 compatible environment.

While the invention has been particularly shown and described with reference to a preferred embodiment thereof, it will be understood by those skilled in the art that various changes in form and details may be made therein without departing from the spirit and scope of the invention.

The embodiments of the invention in which an exclusive property or privilege is claimed are defined as follows:

1. A method for transmitting an image converted from a document containing at least one page of text and/or graphical information generated from a computer application software program running on a computer and for sending the image via electronic mail to at least on e-mail address specified by a user, said method comprising:

detecting a printer driver selection from said user;

capturing said document using said custom printer driver;

converting said at least one page of said document into one or more images using an interface;

attaching said one or more images to an e-mail message;

prompting said user for at least one e-mail address; and causing said e-mail message to be sent to said at least one e-mail address.

2. The method for transmitting an image as claimed in claim 1, further comprising the step of causing the computer to be connected to the Internet.

3. The method for transmitting an image as claimed in claim 1, wherein said capturing of said document comprises generating a file in a Device Independent Bitmap (DIB) format.

4. The method for transmitting an image as claimed in claim 1, wherein said step of converting said one or more pages of said document into one or more images further comprises the step of converting said file from the DIB format into Graphics Interchange Format (GIF).

5. The method for transmitting an image as claimed in claim 1, wherein said capturing said document comprises capturing color information of said document; and converting said one or more pages of said document further comprises conversion of color information.

6. The method for transmitting an image as claimed in claim 1, wherein said capturing said document further comprising utilizing an Application Program Interface and a universal printer driver of a graphical operating system.

7. The method for transmitting an image as claimed in claim 1, further comprises the step of prompting the user for editing said e-mail message.

8. A method for transmitting a document containing at least one page of text and/or graphical information generated from an application software program by a user, wherein the application software program operates under a graphical environment on a computer system having a display, a processing unit, memory devices, data input devices, and network connection means, said method comprising:

- detecting the selection of a custom printer driver by the user;
- invoking said custom printer driver when selected;
- invoking an interface;
- obtaining graphical information about said at least one page of said document to be printed;
- using said printer driver to save said graphical information of said at least one page as Device Independent Bitmap (DIB) file;
- passing said DIB file to said interface;
- using said interface to convert said DIB file to Graphics Interchange Format (GIF) file;
- indexing said at least one page;
- repeating said determining step until there are no more pages to be printed;
- shutting down said printer driver;
- displaying said interface;
- prompting the user for an e-mail address;
- detecting a send command from the user;
- attaching said one or more converted pages in GIF format to said email message; and
- transmitting said message.

9. The method for transmitting an image as claimed in claim 8, wherein the step of prompting the user for an e-mail address further comprises the step of prompting the user for editing an e-mail message.

10. The method as claimed in claim 8, further comprising the step of determining whether the computer is connected to the Internet; and, providing connection to the Internet as needed prior to transmitting said message.

11. The method as claimed in claim 8, further comprising closing said interface after said message is transmitted, wherein closing said interface includes cleaning up said files and the memory.

12. The method as claimed in claim 11, further comprising the step of returning the user to the application software program.

* * * * *